Aug. 31, 1965    R. J. SHORT    3,203,845

METHOD OF MAKING A REINFORCED HOLLOW ELEMENT

Filed April 3, 1963    3 Sheets-Sheet 1

INVENTOR.
ROBERT J. SHORT,
BY
Yungblut, Melville, Strasser + Foster
ATTORNEYS.

Aug. 31, 1965  R. J. SHORT  3,203,845
METHOD OF MAKING A REINFORCED HOLLOW ELEMENT
Filed April 3, 1963  3 Sheets-Sheet 2

INVENTOR.
ROBERT J. SHORT,
BY
Youngblut, Melville, Strasser + Foster
ATTORNEYS.

United States Patent Office 3,203,845
Patented Aug. 31, 1965

3,203,845
METHOD OF MAKING A REINFORCED HOLLOW ELEMENT
Robert J. Short, Cincinnati, Ohio, assignor to Justin Enterprises, Inc., Fairfield, Ohio, a corporation of Ohio
Filed Apr. 3, 1963, Ser. No. 270,388
16 Claims. (Cl. 156—175)

This invention relates to hollow elements such as tanks, conduits and the like, and more specifically to hollow elements which are formed by a filament winding process.

This application contemplates generally a process of helically winding a filament or a plurality of filaments onto a mandrel or form in the presence of a suitable binder. At the present time, the most dynamic aspect of the filament winding process has been in the field of glass fiber reinforced vessels, wherein the filament includes a number of glass fibers and the matrix or binder is one of the conventional plastics such as a polyester or epoxy resin. The solidified binder gives form and a certain degree of rigidity to the resulting vessels; but it is the filament, in this case glass fiber which reinforces and greatly increases the tensile strength of the vessel. It is to be understood, and therefore emphasized at the outset, that while the remainder of this specification is couched largely in terms of a glass fiber reinforced product, this description is to be construed as illustrative only. For example, a high tensile strength wire can be substituted for the glass fiber filament; and numerous other binders having significantly different properties may be substituted for the plastic resin.

According to conventional practice, the manufacture of a given vessel by the filament winding process requires a mandrel or form of the exact dimensions desired in the finished vessel, over which the filament may be wound. This means, among other things, that the feeding mechanism which must traverse the full length of the product being made, and which must be so synchronized with the pay out speed of the filament that a proper helix angle will be achieved, must be variable so that a normal range of products, sizes and shapes may be accommodated. This further requires that the means for releasing the finished vessel from the forms must also be adjustable. And finally, it is well known that the temperature conditions over the entire form must be carefully controlled in order to achieve a proper solidification of the binder after winding. If a number of different forms or mandrels are to be employed, the means for achieving this temperature control must necessarily be rather elaborate.

It should by now be apparent that the expense of maintaining a wide variety of different forms, as well as the additional expense of maintaining elaborately adjustable equipment, has severely limited the sizes and varieties of fiber glass reinforced hollow vessels which can be produced economically. These limitations have not been significant in aero-space applications of filament winding, where the strength to weight advantages have easily outweighed cost considerations. However, for ordinary commercial applications, such factors as simplicity of manufacturing equipment, flexibility of the equipment, and minimized labor costs become much more significant considerations.

Accordingly, it is a primary object of this invention to provide a method of manufacturing a variety of sizes of hollow elements more economically than has heretofore been possible.

More specifically, it is an object of this invention to provide a method of modular or sectional construction of filament wound hollow elements.

Another object of this invention is the provision of a process for manufacturing filament wound hollow elements which utilizes relatively simple, though highly flexible equipment.

Still another object of this invention is the provision of such a process wherein the equipment required is of a size and nature that is easily portable, thereby rendering "on site" construction of very large filament wound tanks economically feasible.

The practice of the process of this invention as described hereinafter will also result in a new product; and it therefore may be stated as an object of this invention to produce a modular or sectional filament wound hollow element, in which each of the sections is securely interlocked with the next adjacent section.

Still a further object of this invention is to provide a filament wound hollow element which includes an inner skin or liner of a substantially different material, and a method for producing this article.

Additional objects and advantages of the invention will become apparent to the skilled worker in the art as this description, taken in conjunction with the accompanying drawings, proceeds. In these drawings.

Briefly, the practice of this invention may be described as a modular or sectional process of forming hollow elements. That is, a unit length hollow cylinder is formed by a filament winding or other suitable process about an open ended form or mandrel. This unit cylinder is then hardened, and slid or moved along the mandrel by a distance less than the unit length. Thereupon a second length of hollow cylinder is formed about the mandrel and overlapping the inboard end portion of the first unit cylinder. As will be explained in more detail hereinafter, the method of this invention may be used to produce an interlock between each of the unit cylinders, so that as the process is continued, a hollow element of any desired length may be fabricated. Even though the method of this invention is extremely useful in forming hollow elements of large sizes, the form or mandrel and other winding equipment may be of a relatively small size which need not be reset or adjusted to accommodate varying length requirements.

Referring now in more detail to the drawings, FIG-

URE 1 shows a form or mandrel 1, secured to and adapted to rotate about an axle 2. It will of course be understood that the axle 2 is connected to a suitable source of driving power, and that the interconnection may be made through various gears and the like so that any desired mandrel speed may be attained.

Figure 1:
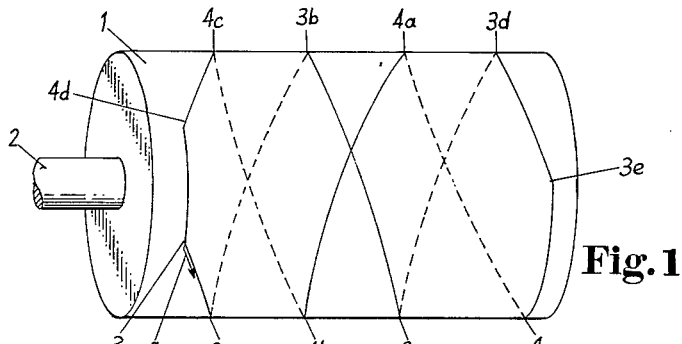
FIGURE 1 is a perspective view showing a mandrel and the initial wind pattern according to the practice of this invention.

The wall of each unit cylinder is formed by winding a filament onto the form 1 in a helical pattern. As shown in FIGURE 1, the helical pattern consists of an outgoing helix beginning at the point 3 and going through the points 3a, 3b, 3c and 3d and ending at the point 3e. Between the points 3e and 4 there is a dwell, or a portion where the filament is wound in a plane perpendicular to the axis of rotation of the form 1. Beginning at the point 4 there is a return helix which is of equal helical angle, but opposite in direction to the outgoing helix 3, 3e. The return helix begins at the point 4, crosses the points 4a, 4b, and 4c, and ends at the point 4d. Once again there is a dwell between the points 4d and 5. At the point 5 a second helical pattern, or more specifically, the outgoing helix of a second helical pattern is begun. And it will be noted that the point 5 lies on the same circle of the cylinder as the point 3, and that it is substantially adjacent thereto. This will mean that both the outgoing and return helixes of each subsequent pattern will lie substantially alongside the outgoing and return helixes respectively of the immediately preceding helical pattern.

The above described winding procedure has been found preferable for most applications. However, it should be understood that the dwell portions 3e–4 and 4d–5 have been exaggerated in the drawings, and that the term "dwell" as used in this application should be construed to include any winding process involving a non-instantaneous helix reversal. That is, under certain conditions, even though the feeding mechanism reverses substantially instantaneously, the momentum of the filament itself wil create a sufficient "dwell" for the practice of this invention. It will also be understood that while the open helical pattern described above produces excellent results, the filament pattern may be in the form of a closed helix in which consecutive convolutions lie immediately adjacent each other, or may even be random wound.

According to the preferred practice of this invention, the mandrel or form 1 rotates in a fixed position, while the filament is fed from a feeder mechanism which reciprocates in a path parallel to the axis of the form. However, it will of course be understood that these elements can in many circumstances be reversed. In other words, the feeder mechanism can be maintained stationary while the form itself is reciprocated during its rotation. Furthermore, it is within the purview of this invention to maintain the form 1 in an absolutely stationary position, while the feeder mechanism is rotated thereabout, and reciprocated while being so rotated. It should further be understood that the term filament as used in this application refers to either a single fiber, to a strand comprised of a plurality of fibers, or to a plurality of strands.

Figure 2:
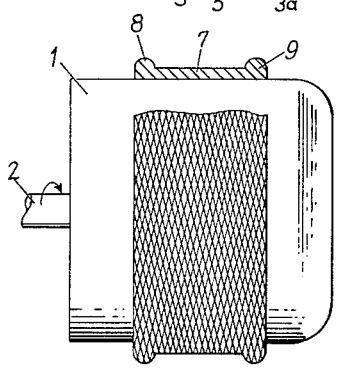
FIGURE 2 is a side elevational view showing the first unit of a cylinder wound according to this invention, partially broken away.

The winding process as just described is carried on until a wall having the desired thickness is formed. With reference to the upper portion of FIGURE 2 wherein the wall of the unit cylinder is shown in cross section, its thickness would be determined at the point 7. It will be noted that the foregoing winding procedure will result in the enlarged portions or collars 8 and 9 at the ends of the cylinders. These enlarged portions are formed by the accumulation of the filament during the dwell at the end of both the outgoing and the return helix as described above.

In the normal practice of this invention the filament which is helically wound on the form 1 will be non-self-sustaining. In order to render the unit cylinder rigid, a binder or matrix must be added to the filament during the process of winding. As is well known in the art, this can be accomplished by passing the filament through the binder as it approaches the film, by simultaneously adding the binder directly to the mandrel, or by pre-impregnating the filament. When the binder sets or solidifies, the result is a cylinder held rigid by the binder, but reinforced and given high tensile strength by the encased filament.

Once the binder has set sufficiently in the first unit cylinder, this unit must be released from the mandrel by any appropriate means. According to conventional practice, this release may be accomplished in several ways. On the one hand the form or mandrel may be precoated with a parting agent prior to the helical winding. The presence of the parting agent permits the unit cylinder under the application of force to be slid along the form or mandrel. On the other hand it is also well known that the form or mandrel may be made collapsible or at least partly collapsible. After the first unit cylinder has hardened, the mandrel may be collapsed thereby releasing the finished cylinder.

When the unit cylinder has been released it is moved along the form toward its open end for a distance slightly less than the unit length.

Figure 3:
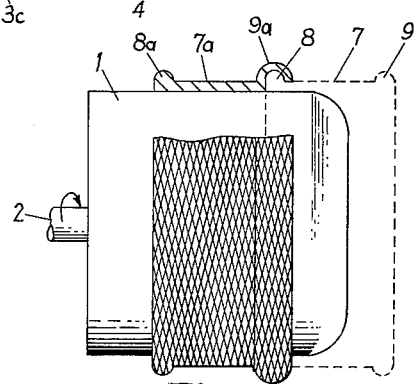
FIGURE 3 is a view similar to FIGURE 2 showing a fully wound second unit in place.
Figure 4:
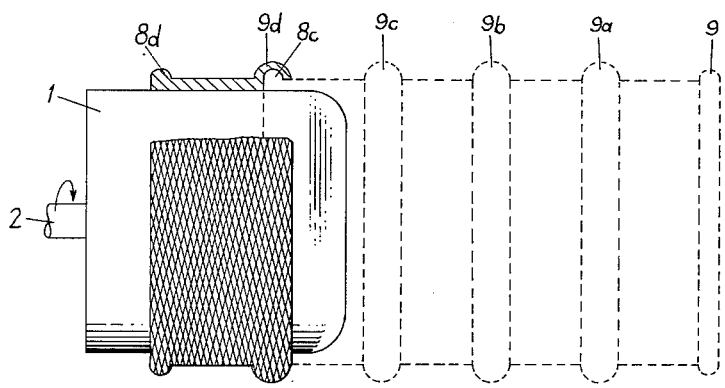
FIGURE 4 is a view similar to FIGURE 2 showing a completed product made according to the process of this invention ready for removal.

Thereafter a second unit cylinder is wound about the mandrel in precisely the same manner described above for the first cylinder, with the outboard end of the second cylinder overlapping the inboard collar 8 of the first cylinder. (For the sake of convenience the same reference numerals used in describing the first unit cylinder have been used in describing all subsequent unit cylinders with the addition of the lower case letters a, b, etc.). As seen in FIGURES 3 and 4, the overlapping of the outboard collar of any given unit cylinder over the inboard collar of the immediately preceding unit cylinder will form an interlocking joint, and once the binder has set the joint will almost disappear, in effect forming one integral hollow structure of twice the unit length, and having a substantially central annular rib. It will therefore be apparent that by this method of construction, even though the hollow element is formed in a plurality of sections, the sections are all bound together by an interlocking joint of great strength. The annular ribs will, of course, add to the strength and rigidity of the hollow element.

As shown in FIGURE 4 the process just described may be repeated as often as desired (five units are shown) to produce a hollow element of any desired length. As the finished lengths leave the mandrel or form 1, they must be supported in substantial alignment with the form. This may be accomplished by means of a plurality of supporting rollers, or a crane supported swivel axis.

The method of this invention can also be utilized to produce a closed end vessel, as for example a storage tank, as opposed to the type of conduit described above. If such a product is desired, the first step would include the development of an appropriate end closure member. The end closure member can be formed by any conventional means. For example, it may be laid up from a plurality of glass mats impregnated with a fiber glass resin, or it may be formed from an entirely different material, such as steel or the like, by any well known forming process.

Figure 5:
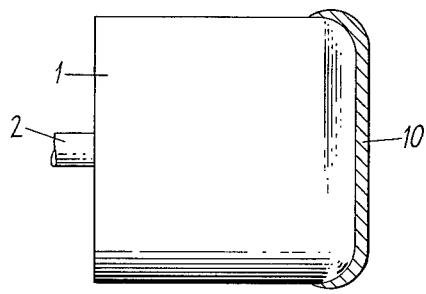
FIGURE 5 is a side elevational view of a form or mandrel showing a bottom closure in cross section positioned thereon.

As shown in FIGURE 5, a preformed bottom or end closure member 10 is placed over the end of the form or mandrel 1.

Figure 6:
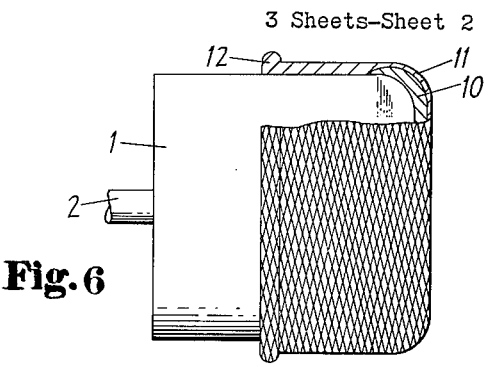
FIGURE 6 is a view similar to FIGURE 2, but showing the first unit as wound over the bottom closure member.
Figures 7, 8:
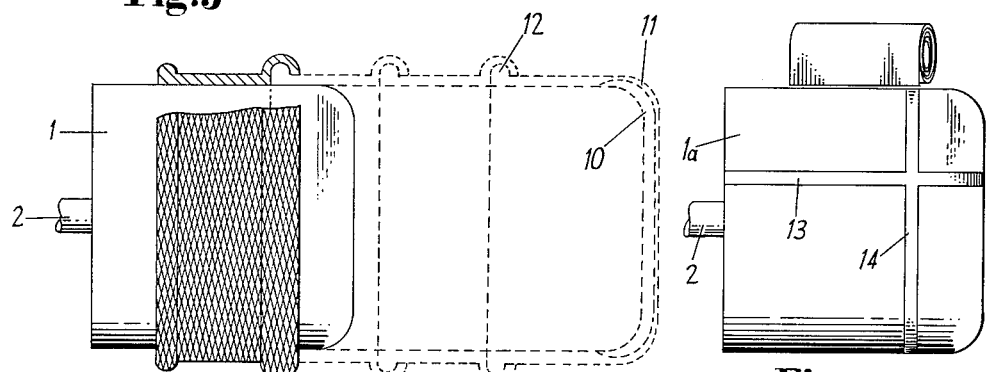
FIGURE 7 is a view similar to FIGURE 4 showing a completed product having a bottom closure member.
FIGURE 8 is a side elevational view of a mandrel according to a further modification of the invention.
Figures 9, 10:
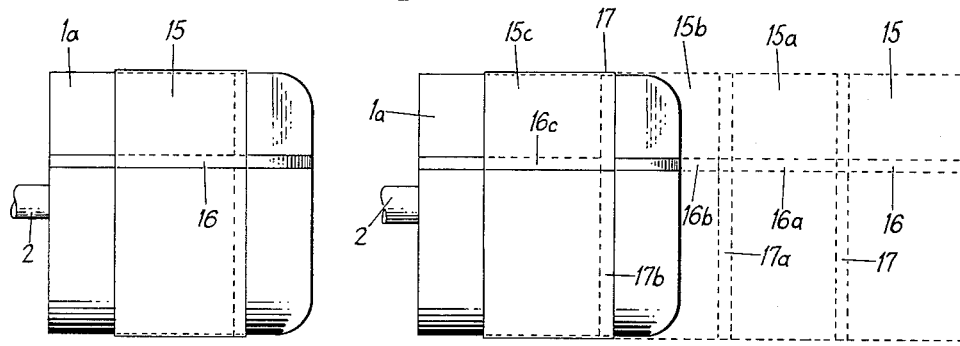
FIGURE 9 is a side elevational view showing the first section of an inner skin laid on the mandrel of FIGURE 8.
FIGURE 10 is a view similar to FIGURE 9 showing a plurality of inner skin section joined according to the teachings of this invention.

As shown in FIGURE 6, a filament is then wound about the mandrel 1 in a helical pattern in the manner described above, with the dwell at the open end of the mandrel (3e to 4 in FIGURE 1) overlapping the end closure member 10, as at 11. That is, the dwell portion 3e–4 of the filament will form a chord across the end closure member. As seen in the upper portion of FIGURE 6 where the wall and end are shown in cross section, the accumulation of those dwell chords will result in a first unit cylinder having an interlocked base. The inboard end of the first unit cylinder will have a collar 12 as described earlier. Subsequent unit lengths can be added by the process described above to produce a structure as shown in FIGURE 7 of the accompanying drawings.

This modular method of construction is also very well adaptable to the formation of a hollow conduit or tank having an inner liner of a special purpose material. For example, the inner lining can be formed of a very thin sheet of polypropylene, or even stainless steel. This aspect of the invention may be accomplished by the modifications shown in FIGURES 8 through 11. In the preferred form of the invention, the form or mandrel 1a may be provided with a longitudinal welding element 13, and a circumferential welding element 14 near its outer end. A strip 15 of the desired liner material (the width of which is substantially equal to the unit length) is wound about the mandrel with an overlapping longitudinal seam 16. The longitudinal edges of the strip 15 are then joined in the area of the overlap 16 by means of welding element 13 in the mandrel. It will of course be understood that the welding element will be of a type adapted to accommodate the liner material being used. That is, if the liner is to be constructed of stainless steel, the welding element would be an ordinary electric welding circuit; and if the liner material is polypropylene, the welding element can be a heat pressure bar.

In any event, the unit length liner cylinder thus formed is then slid along the mandrel 1a a distance less than one unit length as described above. Thereupon, a subsequent strip of liner material 15a may be wound about the mandrel, circumferentially overlapping the previously formed liner cylinder as at 17, and having a longitudinal overlapping seam 16a. The longitudinal welding element 13 then serves to join the longitudinal edges of the layer 15-15c, and the circumferential welding element 14 serves to interlock the adjacent liner cylinders.

It will be apparent that the above described method of overlapping and joining the successively formed liner cylinders is exemplary only, and does not limit the invention. For example, in same cases, adjacent liner cylinders can be butt joined to each other, with or without a reinforcing strip.

Figure 11:
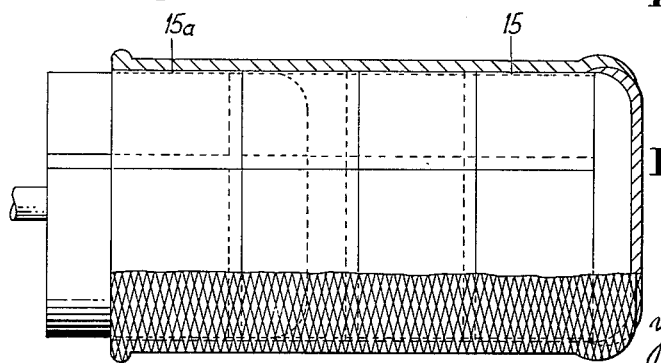
FIGURE 11 is a side elevational view showing a filament wound about the inner skin shown in FIGURE 10.

The liner shell may be covered with a filament wound wall by the modular or sectional process of this invention. That is, as each liner section is formed, it is covered with a unit length filament wound wall, offset slightly with respect to the liner. By virtue of the offset, subsequent liner sections can overlap the preceding liner section, while the filament windings overlap and interlock as described above. Or, if desired, the entire liner shell may be completed to the desired length, and then overwound with a single continuous helical pattern as shown in FIGURE 11.

Although the foregoing operations have been described and illustrated as a horizontal process, it will of course be understood that the method of this invention is equally well suited to vertical winding, with each successively formed section being hoisted vertically one unit distance along a fixed form, thereby achieving any desired height. This vertical method of operation is particularly important in the fabrication of tanks or vessels of extremely large size, wherein it is impossible, or at least highly impractical from an economic standpoint, to transport a preformed article to the site of its ultimate use. By virtue of the method of this invention, easily portable equipment and supplies may be delivered to the consumer, and the tank or vessel wound "on site."

Figure 12:
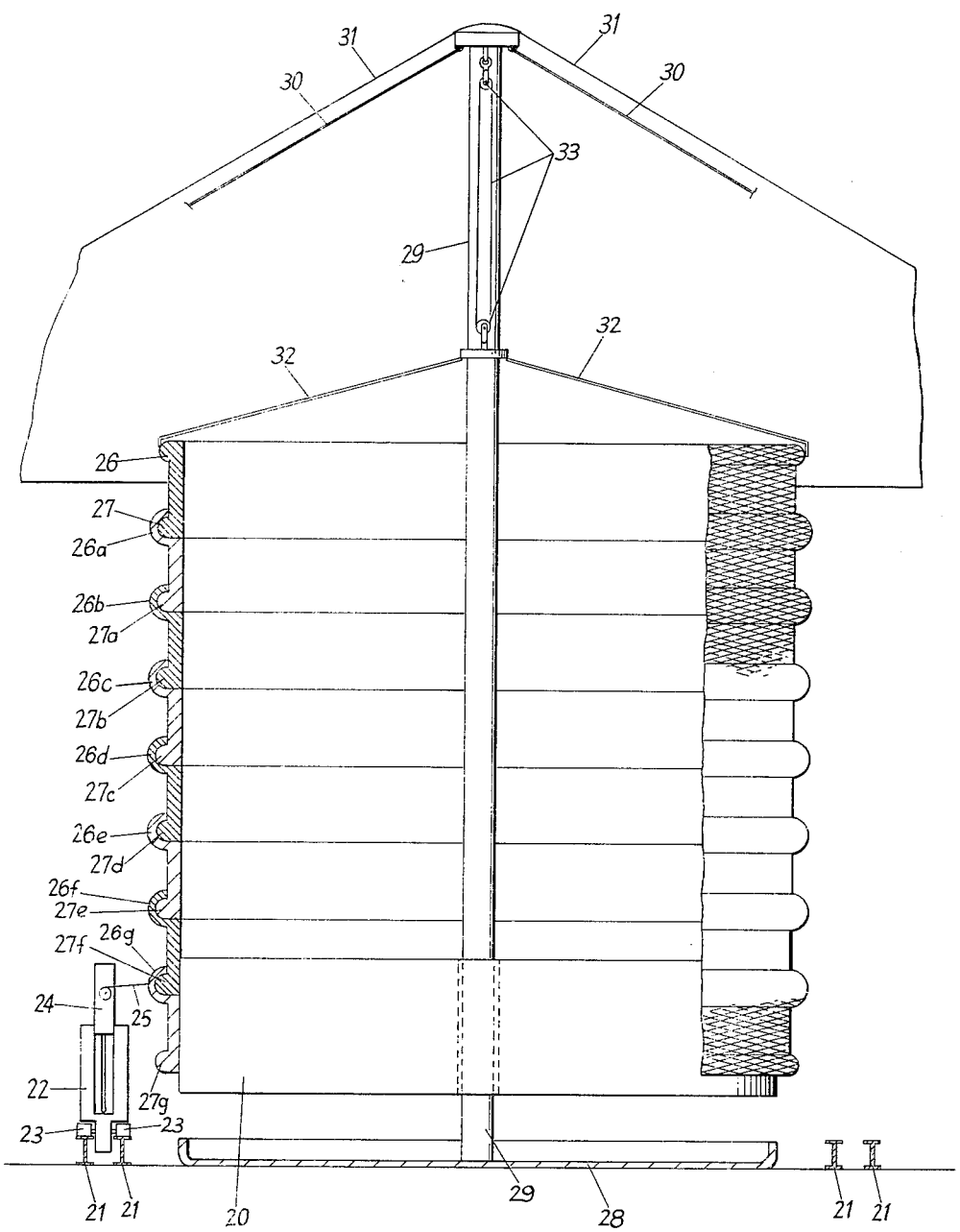
FIGURE 12 is a showing of a modification of this invention, partly in side elevation and partly in cross section.

In the preferred practice of this aspect of the invention, the form will be made up of a plurality of individual and relatively small panels which may be secured together and braced by any appropriate means, so that the resulting structure is readily collapsible and removable from a finished vessel. The construction of the form does not as such, form a part of this invention, and hence its details are neither shown nor described. With reference to FIG. 12, the outer surface of a form has been indicated at 20.

Further, in the preferred practice of this invention, the form and vessel being produced remain stationary, while the winding and feeding mechanism are made to rotate thereabout. As illustrated in FIG. 12, this requires only a suitable pair of tracks 21 which circumferentially surround the form 20. A carriage 22 provided with the wheels 23 is adapted to ride along the tracks 21 and will be caused to rotate around the form 20 at a given speed. The carriage 22 carries a column 24 mounted for vertically reciprocating movement. The column 24 includes the feeder or pay out means from which is drawn a filament strand 25 which is wound about the form as the carriage goes along the track 21.

It will, of course, be understood that by virtue of this arrangement, the same relative movement as described above will be accomplished, and therefore, the unit length hollow cylinders may be wound as indicated in FIGS. 1 through 4. This will produce the upper collars 26 to 26g inclusive and the lower collars 27 to 27g inclusive. As was described above, the upper collar (26a-26g) of each subsequently wound unit length cylinder will overlap the lower collar (27-27f) of the immediately preceding unit cylinder.

An exemplary embodiment of a complete vertical winding operation may be described as follows. A bottom 28 may be laid up or formed from suitable material as described earlier, and is set in the proper location on the ground or floor, where the completed vessel is to be used. A mast 29 is set in the center of the bottom 28 and is supported by means of the guy lines 30. A cover 31 can be placed over the guy lines for outdoor construction. It will of course be understood that if desired, the mast 29 may be sectional in design so that as the construction proceeds, additional mast sections may be added, until the vessel is completed. A form 20 is then set up above the base 28, and may be braced to the mast 29 is desired. A set of tracks 21 are then laid about the circumference of the base 28. As described above, a first unit cylinder is then formed about the form 20 and in the case of a plastic reinforced vessel, the plastic binder is then solidified. The first formed unit cylinder is the uppermost unit shown in FIG. 12, and includes the collars 26 and 27. It will of course be understood that this unit was wound in the position indicated for the unit having the collars 26g and 27g. If the vessel or tank is to be enclosed, a roof 32 is added at this time. It may be secured to the top of the first unit cylinder by any suitable means, including bolts, welding or even an overlapping filament wind. A suitable block and tackle arrangement 33 will then be secured to the apex of the roof 32, and may be used to raise the first formed cylinder slightly less than one unit length. It should be understood that in order to easily accomplish this hoisting operation, it is preferably to slightly collapse the form 20, to release the cylinder therefrom.

After the first formed cylinder has been raised one unit length, the form 20 may be returned to its original size and configuration, and a second section wound thereabout, in the same manner as described above, and overlapping the lower collar 27 of the first unit. By alternately raising each successive segment, and thereafter overlapping the subsequent winding, any desired height may be obtained.

When the desired tank height has been achieved, the form 20 and its braces may be disassembled and removed; the entire structure is then lowered back upon the base 28, and securely fastened thereto, and the mast 29 is removed.

By virtue of the arrangement just set forth, it is possible to construct an extremely large storage vessel, and to carry out such construction with all the necessary mechanisms and operations being carried out at ground level regardless of the final height of the structure.

Numerous modifications may be made in this invention without departing from its scope and spirit. For example, the modular or sectional method of construction is applicable to a wide variety of unit wall constructions, among which would be the formation of each unit length section or cylinder by spraying a mixture of a plastic resin carrying chopped fibers of a reinforcing element onto the form. As described before, each unit length section is then moved or slid along the form a distances less than the unit length, and subsequent, overlapping unit sections formed. By this spraying method, the resin of two adjacent sections in the region of the overlap would bond together, thereby forming an interlock. Accordingly, no limitation is intended except insofar as set forth in the appended claims.

What is claimed as new and what it is desired to secure by Letters Patent is:

1. A method of forming a hollow element comprising the steps of (a) winding a filament in a helical pattern about a form to produce a hollow unit having at least one enlarged end portion, (b) sliding said hollow unit relative to said form a distance less than the length of said unit, and (c) thereafter winding said filament in a helical pattern about said form to produce a second hollow unit, said last named helical pattern overlapping said enlarged end portion of said first hollow unit, thereby producing an interlock between said first and second unit.

2. The method claimed in claim 1 wherein said first unit includes an end closure member, said closure member being interlocked to said first unit by overlapping said first named helical pattern about the periphery of said closure member.

3. The method claimed in claim 1 including the steps of alternately sliding the last formed unit relative to said form a distance less than the length of said unit and winding said filament in a helical pattern to form additional units, each said helical pattern overlapping its adjacent prior formed unit.

4. The method of producing a hollow element including the steps of (a) winding a filament into a first helical pattern of a pre-determined length about a form having a greater length than said helical pattern, said helical pattern including an outgoing helix, a dwell at the end of said helix, an equal but opposite return helix, and a dwell at the end of said return helix, (b) repeating said step of winding a helical pattern to form a hollow unit having a wall of the desired thickness, whereby the accumulation of said filaments caused by said dwell forms a collar at each end of said hollow unit, (c) sliding said hollow unit relative to said form a distance less than the length of said helical pattern, and (d) thereafter producing at least one subsequent hollow unit by the same steps as said first formed unit, the helical patterns of each said subsequently formed units overlapping a collar on its adjacent prior formed unit.

5. The method claimed in claim 4 wherein said first unit includes an end closure member, said closure member being interlocked to said first unit by overlapping said helical pattern of said first unit about the periphery of said closure member.

6. The modular method of making a reinforced hollow element comprising the steps of (a) winding a filament about a form to produce a circumferential wall for a unit of said element, (b) forming an annular collar on at least one end of said wall, (c) introducing a settable binder into said wall and causing said binder to set, to bind said windings together, (d) moving said unit relative to said form, and (e) thereafter producing at least one subsequent unit in the same manner as said first formed unit, each said subsequent unit being interlocked with its adjacent prior formed unit.

7. The method claimed in claim 6 wherein said first unit includes an end closure member, said closure member being interlocked to said first unit by overlapping said circumferential wall of said first unit about the periphery of said closure member.

8. The method of forming a modular liner for a hollow element including the steps of (a) applying a unit length layer of liner material about a form, (b) joining the longitudinal edges of said layer to form a hollow unit, (c) moving said unit relative to said form a distance less than said unit length, (d) applying at least one subsequent unit length layer of liner material about said form, said last named layer overlapping said prior formed unit, (e) joining the longitudinal edges of said subsequent layer to form an additional hollow unit, and (f) joining said first formed unit to said next formed unit.

9. The method claimed in claim 8 including the steps of winding a filament in a helical pattern about said liner to form a reinforced hollow structure.

10. The method claimed in claim 9 including the steps of introducing a settable binder into said helical pattern, and causing said binder to set, to hold said helical pattern together.

11. The method of forming a hollow structure including the steps of (a) forming a unit length hollow cylinder about a mandrel, (b) moving said hollow cylinder relative to said mandrel a distance less than said unit length, (c) forming at least one subseqent unit length hollow cylinder about said mandrel, each said subsequent cylinder overlapping the immediately preceding cylinder, and (d) interlocking adjacently formed cylinders in the area of said overlap.

12. A method of forming a hollow structure having a vertical axis comprising the steps of (a) locating a bottom member at the desired site of said structure, (b) providing a form having a vertical axis and substantially the same diameter as said bottom, in alignment with said bottom, (c) winding a filament in a helical pattern about said form to produce a hollow unit having an enlarged collar at each end, (d) releasing said unit from said form, (e) raising said unit vertically a distance less than said unit length, (f) thereafter winding said filament in a helical pattern about said form to produce at least a second hollow unit, said helical pattern of said second unit overlapping the lower collar of said first unit, thereby producing an interlock between said first and second units, (g) removing said form, (h) securing said structure to said base.

13. The method of claim 12 including the step of securing a roof for said structure to said first formed unit prior to raising said unit vertically.

14. A method of forming a hollow structure having a vertical axis comprising the steps of (a) providing a form having a vertical axis, (b) forming a hollow unit about said form, (c) releasing said unit form, (d) raising said unit vertically a distance less than the length of said unit, and (e) thereafter forming at least one subsequent hollow unit about said form, each said subsequent unit overlapping the immediately preceding unit and being interlocked thereto.

15. A method of forming a hollow element comprising the steps of:
 (a) winding a filament in a helical pattern about a form to produce a hollow unit having at least one enlarged end portion, and
 (b) thereafter winding said filament in a helical pattern to produce a second hollow unit axially aligned with said first unit, said last named helical pattern overlapping said enlarged end portion of said first hollow unit, thereby producing an interlock between said first and second unit.

16. The method of forming a lined, filament wound hollow element comprising the steps of:
 (a) forming a hollow, unit length liner cylinder about a mandrel,
 (b) moving said liner cylinder longitudinally with respect to said mandrel,
 (c) forming at least one subsequent unit length liner cylinder about said mandrel in axial alignment with said first formed cylinder,
(d) joining each subsequent liner cylinder to the adjacent prior formed liner cylinder, and
(e) winding a filament about said joined liner cylinders to form a reinforced, lined hollow structure.

References Cited by the Examiner

UNITED STATES PATENTS

| | | | |
|---|---|---|---|
| 2,106,494 | 1/38 | Debor | 220—3 |
| 2,171,973 | 9/39 | Debor | 220—3 |
| 2,843,153 | 7/58 | Young | 220—83 |
| 2,857,932 | 10/58 | Calderwood | 156—171 XR |
| 2,964,439 | 12/60 | Modigbiani | 156—173 |
| 2,991,210 | 7/61 | Matkovich | 156—177 XR |
| 3,023,135 | 2/62 | Wilshire | 220—83 |
| 3,105,786 | 10/63 | Anderson | 156—173 |

EARL M. BERGERT, *Primary Examiner.*

T. E. CONDON, *Examiner.*

UNITED STATES PATENT OFFICE
CERTIFICATE OF CORRECTION

Patent No. 3,203,845                                   August 31, 1965

Robert J. Short

It is hereby certified that error appears in the above numbered patent requiring correction and that the said Letters Patent should read as corrected below.

Column 4, line 2, for "film" read -- form --; column 5, line 41, for "same" read -- some --; column 6, line 54, for "preferably" read -- preferable --; column 8, line 25, for "subseqent" read -- subsequent --; line 52, after "unit" inser -- from said --.

Signed and sealed this 5th day of April 1966.

(SEAL)
Attest:

ERNEST W. SWIDER                                   EDWARD J. BRENNER
Attesting Officer                                           Commissioner of Patents